US005603447A

United States Patent [19]
Shalosky

[11] Patent Number: 5,603,447
[45] Date of Patent: Feb. 18, 1997

[54] VEHICLE WHEEL WELDING STATION WITH CROSSED STRAIGHT WELDING TORCHES

[75] Inventor: Matthew D. Shalosky, Canton, Mich.

[73] Assignee: Hayes Wheels International, Inc., Romulus, Mich.

[21] Appl. No.: 538,373

[22] Filed: Oct. 3, 1995

[51] Int. Cl.$^6$ ................................................. B23K 31/02
[52] U.S. Cl. ........................................ 228/48; 29/894.322
[58] Field of Search ..................... 29/894.322, 894.323; 228/48, 45

[56] References Cited

U.S. PATENT DOCUMENTS 3,266,702  8/1966  Parent et al. ............................... 228/48

*Primary Examiner*—Kenneth J. Ramsey
*Attorney, Agent, or Firm*—MacMillan, Sobanski & Todd

[57] ABSTRACT

An improved vehicle wheel welding station which minimizes the stoppages of the welding station to replace the contact tip and/or welding wire conduit includes an wheel support fixture for supporting a vehicle wheel and at least three welding torches supported relative to the wheel support fixture. Each of the welding torches is movable with respect to the fixture in a generally radial direction between a retracted non-working position and an extended working position. Each of the welding torches including a generally straight body defining an upper end portion and an opposite lower end portion. The upper end portion of each torch is operatively connected to a conduit assembly adapted to contain and feed a weld wire into the body, and the lower end portion is operatively connected to a nozzle assembly adapted to produce a weld along a selected arcuate portion of a wheel assembly. The station further includes a drive assembly for rotating one of the wheel support fixture and the three welding torches relative to the other one of the wheel support fixture and the three welding torches. The three welding torches are oriented in a crossing relationship relative to one another wherein the upper end portion of the body of a first one of the three welding torches is located above the lower end portion of the body of an adjacent second one of the three welding torches, and the lower end portion of the body of the one of the three welding torches is located below the upper end portion of the body of an adjacent third one of the three welding torches.

9 Claims, 3 Drawing Sheets

VEHICLE WHEEL WELDING STATION WITH CROSSED STRAIGHT WELDING TORCHES

BACKGROUND OF THE INVENTION

This invention relates in general to vehicle wheels and in particular to an improved vehicle wheel welding station used to produce such vehicle wheels.

A conventional vehicle wheel is typically of a two-piece construction and includes an inner disc and an outer "full" rim. The disc can be cast, forged, or fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the disc is used. In both types of constructions, the outer annular portion of the disc is secured to the rim by welding.

A typical wheel welding station for securing the disc to the rim to produce a steel or aluminum wheel includes a wheel support fixture for supporting the vehicle wheel, and a plurality of welding torches. Typically, for producing automobile and truck vehicle wheels, four torches are provided. However, the number of torches depends upon the particular wheel assembly and/or the welding cycle time which is desired. The wheel support fixture can rotate the wheel relative to torches or, alternatively, the torches can rotate relative to the wheel.

A typical welding torch includes a body having a first end portion and a second end portion. The first end portion is connected to a known cable assembly. The cable assembly contains a welding wire conduit, a gas line conduit, a recirculating cooling water conduit, and an electrical supply cable. The second end portion has a consumable nozzle installed thereon. The nozzle is conventional in the art and includes a contact tip. The welding wire conduit, gas line conduit, and electrical supply conduit all extend from the cable assembly through the torch and to the nozzle. Depending upon whether the nozzle is water cooled, the recirculating cooling water conduit can also extend from the cable assembly through the torch and to the nozzle.

The body of the torch adjacent the second end thereof is bent in a "goose neck" configuration at a predetermined angle to provide a predetermined welding work angle with respect to a selected surface of the vehicle wheel. Typically, for a "bead seat" attached wheel, the body of the torch is bent at an angle of approximately 70° to provide a welding work angle of approximately 20°. For a "well attached" wheel and a "full face" wheel, the body of the torch is bent at an angle of approximately 45° to provide a welding work angle of approximately 45°.

When assembling an aluminum wheel, aluminum wire is used and the wire feed conduit constructed from nylon is used to provide a feed path for the aluminum wire. The aluminum wire usually contains surface imperfections, such as burrs, which can create grooves in the inner surface of the nylon conduit or become imbedded into the nylon conduit, especially at the bent portion of the conduit. Thus, as the aluminum wire is fed through the conduit, the grooves impair the feeding of the aluminum wire through the torches and/or imbedded aluminum particles flake off the aluminum as it passes through the conduit creating aluminum shavings which settle in the bent portion and/or contact tip of the respective torches.

During operation of the wheel welding station, the aluminum shavings deposited in bent portion can cause the torches to clog. Once the torches become clogged, the aluminum wire will no longer be able to be fed through the conduit to the end of the torches. As a result, the weld wire extending from the contact tip melts back to and together with the contact tip. This requires stoppage of the wheel welding station so that the contact tip and also, preferably, a new nylon conduit can be installed.

When the welding station is used to weld a steel wheel, steel wire is provided. Unlike aluminum wire, the steel wire can rust. Thus, the steel wire is usually coated with copper or a lubricant to prevent rusting. Also, since the steel wire is much harder than the aluminum wire, the conduit for the steel wire is constructed from steel. The steel wire also usually contains surface imperfections, such as burrs, which can create grooves in the inner surface of the steel conduit, especially at the bent portion of the conduit, or can break off. While clogging of the torch when using steel wire is not as prolific a problem as it is when using aluminum wire, eventually, the contact tip and the wire conduit of the welding station have to be replaced.

It is known to use a single robotically controlled welding torch having a straight body for welding a vehicle wheel for development work.

SUMMARY OF THE INVENTION

This invention relates to an improved vehicle wheel welding station which minimizes the stoppages of the welding station to replace the contact tip and/or welding wire conduit by reducing the shavings which are produced as the welding wire is advanced through the torches by using welding torches having straight bodies and orienting the torches in a crossing relationship relative to one another. In particular, the vehicle wheel welding station includes an wheel support fixture for supporting a vehicle wheel and at least three welding torches supported relative to the wheel support fixture. Each of the welding torches is movable with respect to the fixture in a generally radial direction between a retracted non-working position and an extended working position. Each of the welding torches including a generally straight body defining an upper end portion and an opposite lower end portion. The upper end portion of each torch is operatively connected to a conduit assembly adapted to contain and feed a weld wire into the body, and the lower end portion is operatively connected to a nozzle assembly adapted to produce a weld along a selected arcuate portion of a wheel assembly. The station further includes a drive assembly for rotating one of the wheel support fixture and the three welding torches relative to the other one of the wheel support fixture and the three welding torches. The three welding torches are oriented in a crossing relationship relative to one another wherein the upper end portion of the body of a first one of the three welding torches is located above the lower end portion of the body of an adjacent second one of the three welding torches, and the lower end portion of the body of the one of the three welding torches is located below the upper end portion of the body of an adjacent third one of the three welding torches.

Other advantages of this invention will become apparent to those skilled in the art from the following detailed description of the preferred embodiment, when read in light of the accompanying drawings.

DESCRIPTION OF THE PREFERRED EMBODIMENT

Figure 1:
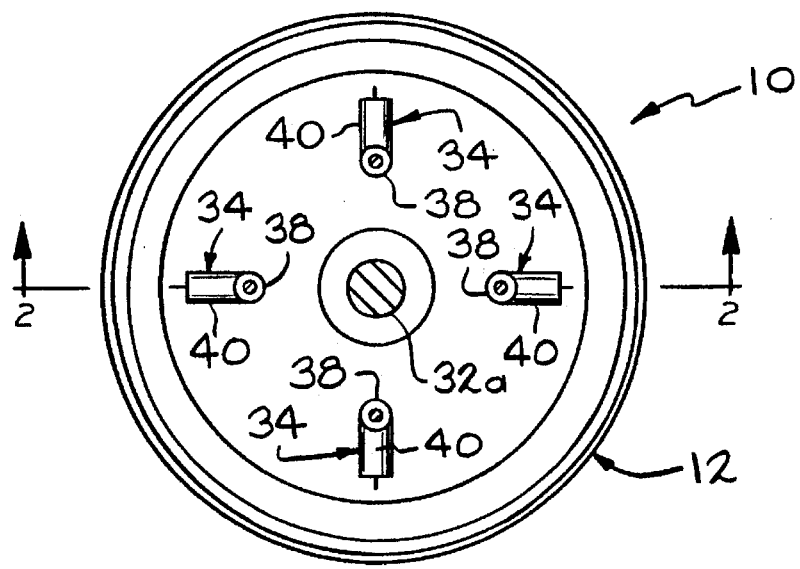
FIG. 1 is a schematic diagram of a prior art wheel welding station showing the welding torches in a retracted position.
Figure 2:
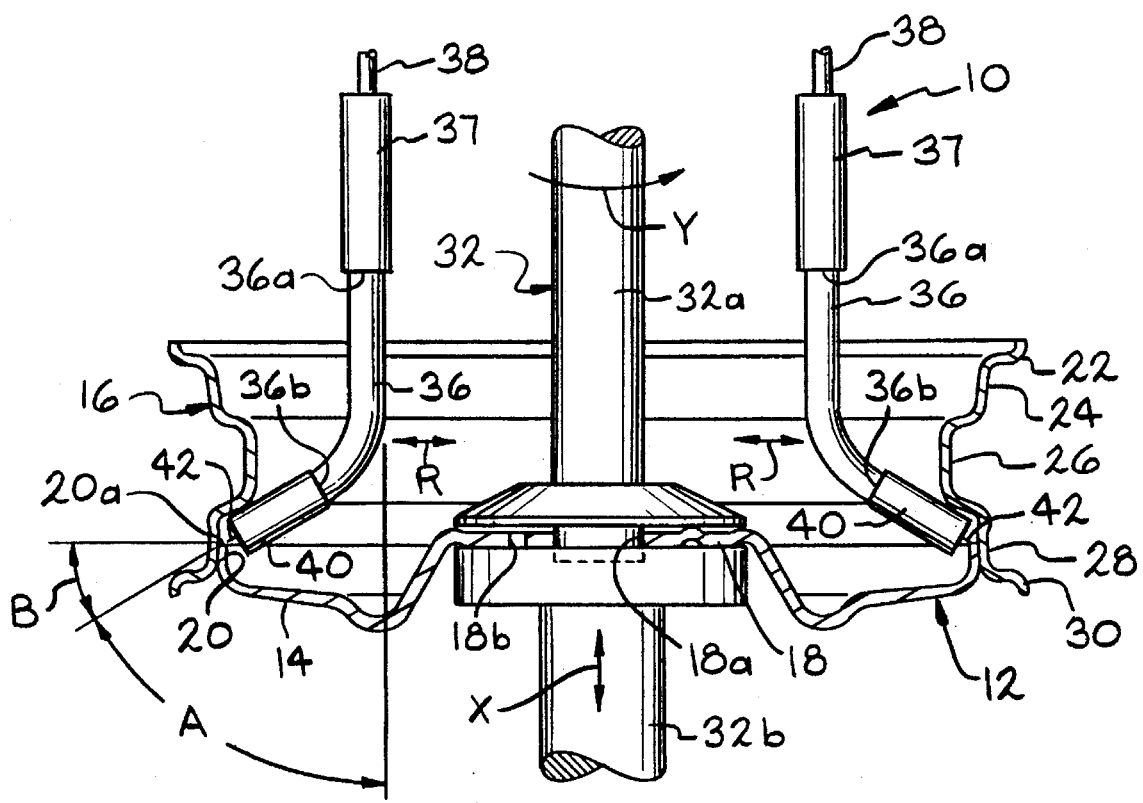
FIG. 2 is a sectional view taken along line 2—2 of FIG. 1 and showing the welding torches in an extended position.
Figure 3:
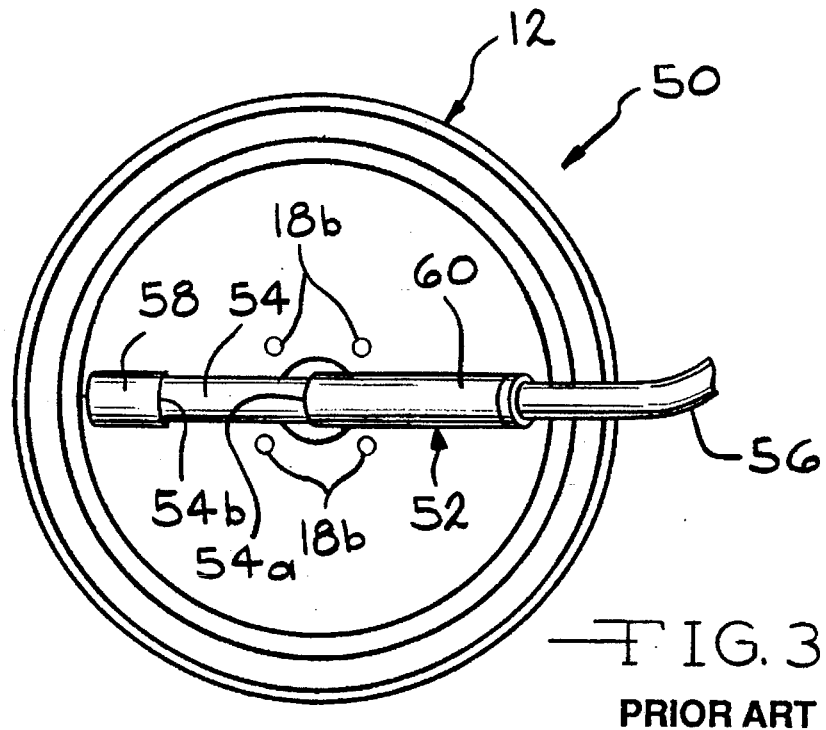
FIG. 3 is a schematic diagram of another prior art wheel welding station showing the welding torch in a retracted position.

Referring now to FIGS. 1 and 2, there is illustrated a prior art welding station, indicated generally at 10, for use in producing a conventional two-piece vehicle wheel 12. The vehicle wheel 12 is illustrated as being a conventional bead seat attached wheel, and includes an inner disc 14 and an outer full rim 16. However, it should be understood that the invention can be used to produce other types of vehicle wheels. For example, the invention can be effectively used to produce a well attached wheel (such as shown in FIG. 3 of U.S. Pat. No. 5,188,429 to Heck et al.), a full face wheel (such as shown in U.S. Pat. No. 5,295,304 to Ashley, Jr.), and a "modular wheel" including a partial rim and a full face wheel disc (such as shown in U.S. Pat. No. 5,360,261 to Archibald et al.), all of these patents incorporated herein by reference.

The disc 14 can be cast, forged, fabricated, or otherwise formed, and is constructed of steel, aluminum, or other suitable alloy materials. The disc 14 includes an inner annular wheel mounting portion 18 and an outer annular portion 20. The wheel mounting portion 18 defines an inboard mounting surface and includes a center pilot or hub hole 18a, and a plurality of lug receiving holes 18b (only one lug bolt receiving hole 18b is illustrated) formed therethrough for mounting the wheel 12 to an axle (not shown) of the vehicle.

The rim 16 is fabricated from steel, aluminum, or other suitable alloy materials, and includes an inboard tire bead seat retaining flange 22, an inboard tire bead seat 24, an axially extending well 26, an outboard tire bead seat 28, and an outboard tire bead seat retaining flange 30.

As shown in FIGS. 1 and 2, the wheel welding station 10 includes a wheel support fixture 32, including an upper member 32a and a lower member 32b for supporting the vehicle wheel 12, and a plurality of welding torches 34. Typically, for producing passenger car and truck wheels, four torches 34 are provided. However, the number of torches 34 may be different than illustrated depending upon the particular wheel assembly and/or welding cycle time which is desired.

Each of the torches 34 is supported relative to the wheel support fixture 32 by a torch support fixture (not shown) in a conventional manner. As will be discussed below, the torch support fixture enables each torch 34 to be movable in a generally radial direction, as indicted by the arrows R in FIG. 2, between a retracted non-working position, shown in FIG. 1, and an extended working position, shown in FIG. 2.

The lower member 32b of the wheel support fixture 32 is movable vertically in the direction of the arrow X between a retracted position (not shown) and an extended position shown in FIG. 2. The upper member 32a of the wheel support fixture 32 is connected to a drive mechanism (not shown) for rotating the wheel 12 relative to the fixture 32 as indicated by the arrow Y.

In operation, the torches 34 and the lower member 32b are moved to their respective retracted positions, and a wheel 12 is loaded onto the lower member 32b. Next, the lower member 32b is moved to the extended position, shown in FIG. 2. Following this, the torches 34 are moved to their extended working positions shown in FIG. 2. The upper member 32a is then actuated to rotate the wheel 12 relative to torches 34 in order that the disc 14 and rim 16 are joined together by welding. Alternatively, the torches 34 can rotate relative to the wheel 12.

The illustrated welding torches 34 are identical to one another. Each torch 34 includes a body 36 having a first end 36a and a second end 36b. The first end 36a of the torch 34 is operatively coupled to a conventional cable assembly 38. The cable assembly 38 contains a welding wire conduit (not shown), a gas line conduit (not shown), a recirculating cooling water line conduit (not shown), and an electrical supply cable (not shown). The second end 36b of the torch 34 has a conventional nozzle assembly 40 installed thereon. As shown in FIG. 2, a piece of welding wire 42 extends from a contact tip (not shown) which is part of the nozzle assembly 40. Also, a torch handle 37 is provided on the body 36 of the torch 34.

As is known, the nozzle assembly 40 can be pushed onto the second end 36b of the torch 34 in an interference fit therewith, or can be threaded onto the second end 36b of the torch 34. All of the above mentioned conduits can extend through the torch 34 into the nozzle assembly 40. The nozzle assembly 40 is a consumable piece of equipment, and is replaced at regular scheduled maintenance intervals.

As best shown in FIG. 2, the body 36 of the torch 34 near the second end 36b thereof is bent in a "goose neck" configuration at a predetermined angle A. This produces a predetermined welding work angle B defined between an end surface 20a of the outer annular portion 20 of the disc 14 and the nozzle assembly 40. In FIGS. 1 and 2, the angle A is illustrated as being approximately 70°, and the angle B is approximately 20°.

Turning now to FIG. 3 and using like reference numbers for corresponding pans, there is illustrated a prior art wheel welding station, indicated generally at 50. The wheel welding station 50 includes a single robotically controlled welding torch 52 having a straight body 54. The torch 52 is operatively connected to a robot arm (not shown). The body 54 of the torch 52 includes a first end 54a and a second end 54b. The first end 54a of the body 54 is operatively coupled to a conventional cable assembly 56. A conventional nozzle assembly 58 is installed on the second end 54b of the body 54 of the torch 52. Also, a torch handle 60 is provided on the body 54 of the torch 52.

The wheel welding station 50 further includes a turntable (not shown) for supporting and rotating the vehicle wheel 12. In operation, the wheel 12 is manually loaded on the turntable, and the torch 52 is moved to a desired working position. The turntable is then actuated to rotate the wheel 12 relative to torch 52 in order that the disc and rim are joined together by welding. In some applications, the torch 52 is moved relative to the wheel 12.

The structure and operation of the wheel welding stations 10 and 50 thus far described are conventional in the art.

Figure 4:
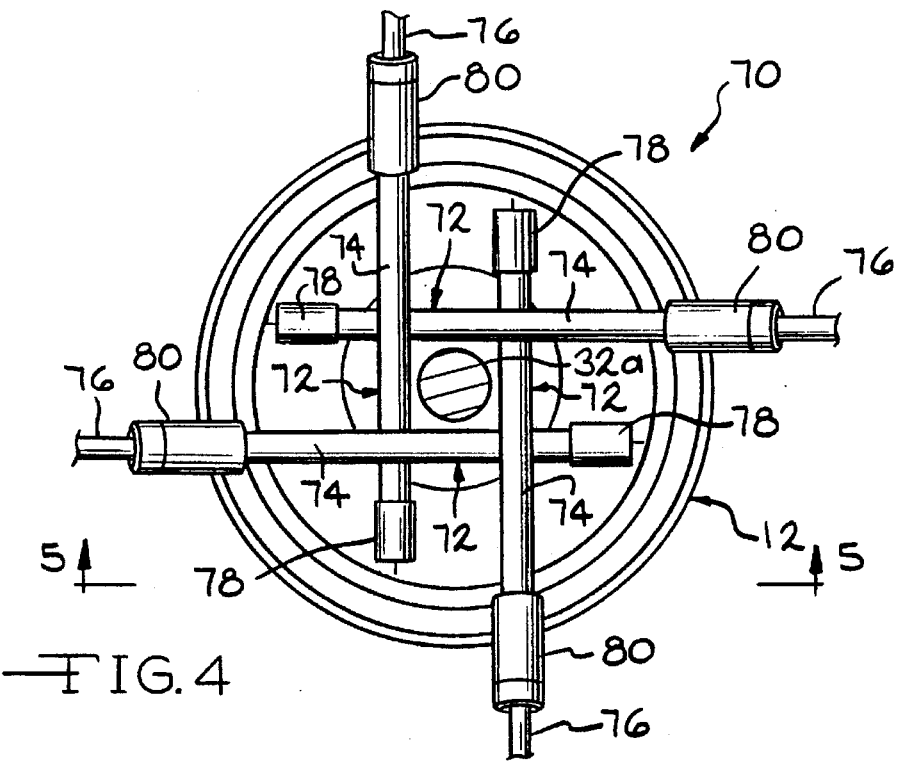
FIG. 4 is a schematic diagram of an improved wheel welding station in accordance with the present invention showing the welding torches in a retracted position.
Figure 5:
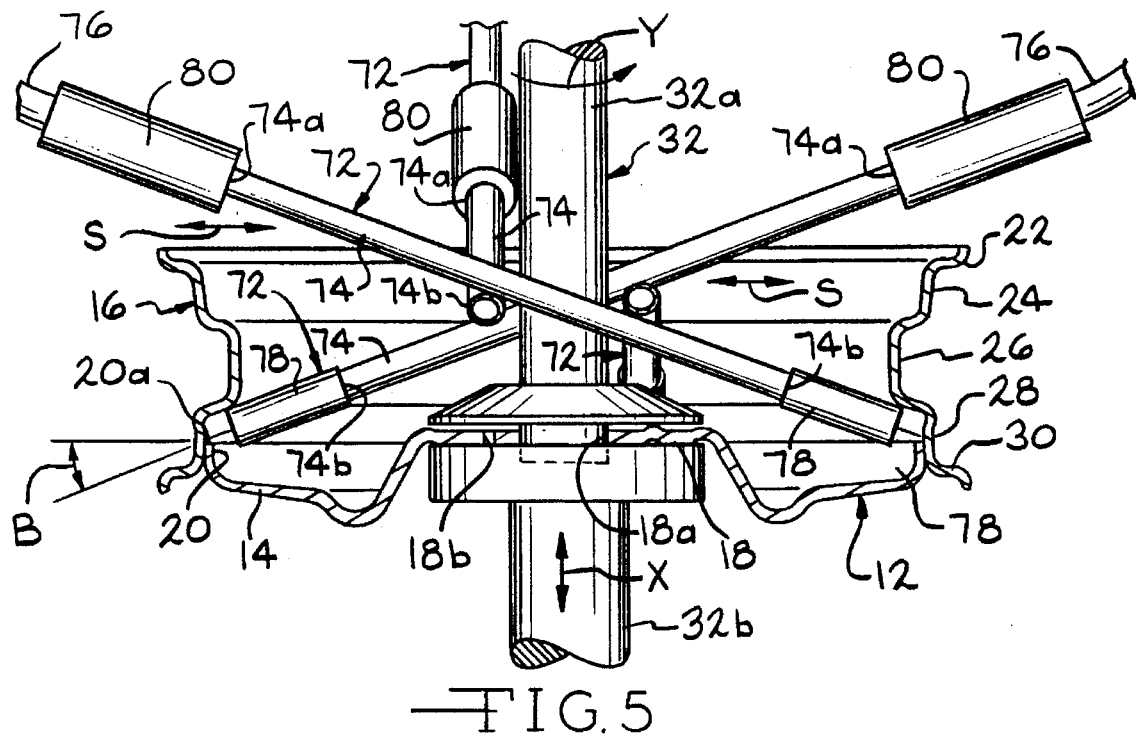
FIG. 5 is a sectional view taken along line 5—5 of FIG. 4 and showing the welding torches in an extended position.

Referring now to FIGS. 4 and 5 and using like reference numbers and letters for corresponding pans and designations, respectively, the structure of a wheel welding station, indicated generally at 70, in accordance with the present invention will be discussed.

As shown therein, the wheel welding station 70 includes a plurality of welding torches 72. Four torches 72 are illustrated in this embodiment. However, the number of torches 72 can be different than illustrated depending upon the particular wheel assembly and/or welding cycle time which is desired. Preferably, as illustrated, a wheel support fixture 32 including an upper member 32a and a lower member 32b is provided and is operative to rotate the wheel 12 relative to torches 70. Alternatively, the torches 72 can rotate relative to the wheel 12.

Each of the torches 72 is supported relative to the wheel support fixture 32 by a torch support fixture (not shown). As will be discussed below, the torch support fixture enables each torch 72 to be movable in a generally radial direction, as indicted by the arrows S in FIG. 5, between a retracted non-working position, shown in FIG. 4, and an extended working position, shown in FIG. 5.

The illustrated welding torches 72 are identical to one another and include a straight body 74 having a first end 74a and a second end 74b. The first end 74a of the body 74 of the torch 72 is operatively coupled to a cable assembly 76. A conventional nozzle assembly 78 is installed on the second end 74b of the body 74 of the torch 72. Also, a torch handle 80 is provided on the body 74 of the torch 72.

As shown in the embodiment illustrated in FIG. 5, each torch 72 is adjusted to be oriented at the predetermined welding work angle B. To accomplish this, the torches 72 are oriented in a crossing arrangement, as shown in FIGS. 4 and 5, with each of the torches 72 oriented directly adjacent the upper member 32a. Also, the body of the torches 72 crosses directly adjacent the body 74 of each adjacent torch 72. Preferably, as illustrated, the body 74 of each torch 72 is of a sufficient length so that the associated torch handle 80 does not interfere with the close positioning of the torches 72 in their crossing arrangement.

Figure 6:
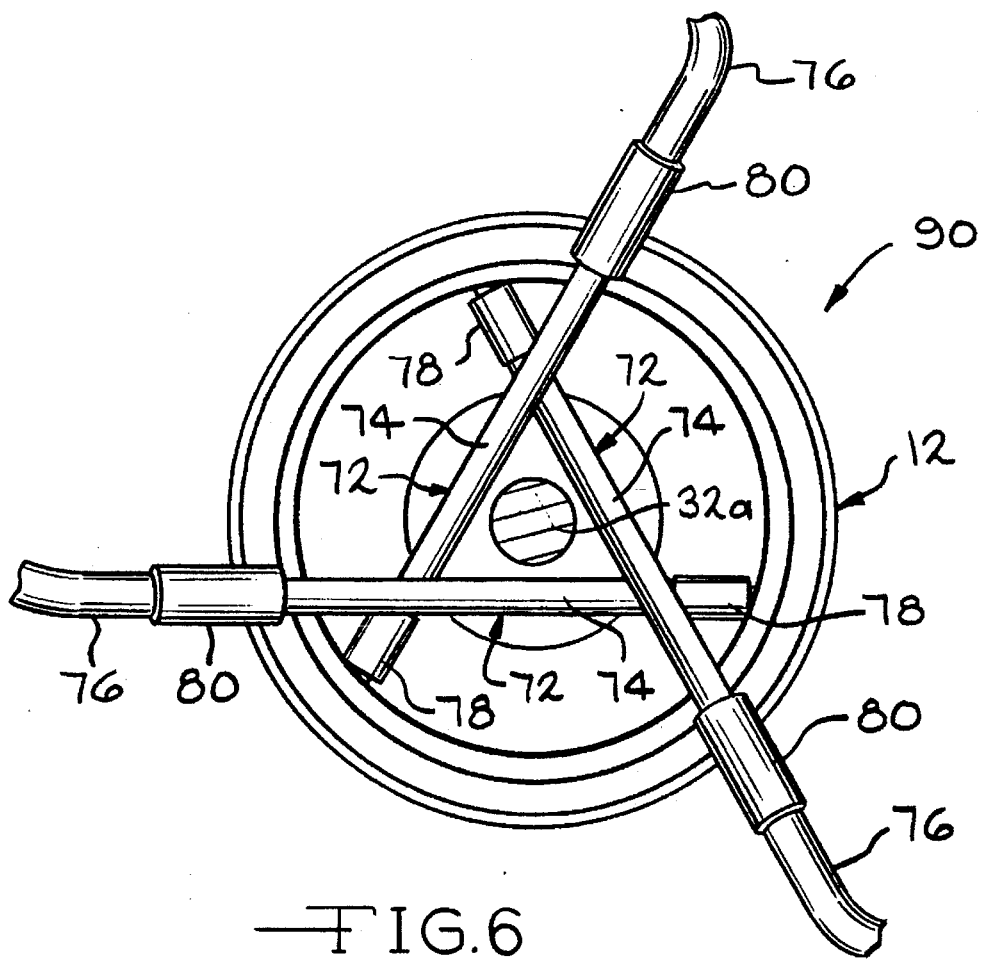
FIG. 6 is a schematic diagram of an alternate embodiment of a wheel welding station in accordance with the present invention showing the welding torches in a retracted position.

FIG. 6 illustrated an alternate embodiment of a wheel welding station, indicated generally at 90, which is identical to the wheel welding station 70 illustrated in FIGS. 4 and 5, except that it includes three welding torches 72 which are oriented in a crossing arrangement.

One advantage of the present invention is that the straight torch body 74 provides a wire feed path which produces less metal shavings compared to that when using a prior art bent torch body illustrated in FIGS. 1 and 2. As a result, the wheel welding stations 70 and 90 of the present invention can be operated for longer periods of time compared to the prior art wheel welding station 10 before the nozzle and/or wire line conduit have to be replaced. For example, the wheel welding station 70 of the present invention has increased the output of aluminum wheels approximately 35% over that of the prior art wheel welding station 10, and has increased the output of steel wheels approximately 5% over that of the prior art wheel welding station. Also, the cycle time required to weld a wheel 12 using the wheel welding station 70 and 90 of the present invention is substantially faster compared to that when welding a wheel using the prior art wheel welding station 50 shown in FIG. 3.

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A vehicle wheel welding station comprising:

an wheel support fixture for supporting a vehicle wheel;

at least three welding torches supported relative to said wheel support fixture and movable with respect to said fixture in a generally radial direction between a retracted non-working position and an extended working position, each of said welding torches including a generally straight body defining an upper end portion and an opposite lower end portion, said upper end portion operatively connected to a conduit assembly adapted to contain and feed a weld wire into said body, and said lower end portion operatively connected to a nozzle assembly adapted to produce a weld along a selected arcuate portion of a wheel assembly;

means for rotating one of said wheel support fixture and said at least three welding torches relative to the other one of said wheel support fixture and said at least three welding torches;

said welding torches oriented in a crossing relationship relative to one another wherein said upper end portion of said body of a first one of said welding torches is located above said lower end portion of said body of an adjacent second one of said welding torches, and said lower end portion of said body of said one of said three welding torches is located below said upper end portion of said body of an adjacent third one of said welding torches.

2. The vehicle wheel welding station defined in claim 1 wherein each of said welding torches is oriented at a predetermined welding work angle in the range of 10° to 55° relative to a selected wheel surface.

3. The vehicle wheel welding station defined in claim 2 wherein said predetermined working weld angle is approximately 20°.

4. The vehicle wheel welding station defined in claim 2 wherein said predetermined working weld angle is approximately 45°.

5. The vehicle wheel welding station defined in claim 1 wherein said wheel welding station includes four welding torches.

6. The vehicle wheel welding station defined in claim 1 wherein said means is operative to rotate said fixture relative to said welding torches.

7. The vehicle wheel welding station defined in claim 1 wherein said means is operative to rotate said welding torches relative to said fixture.

8. The vehicle wheel welding station defined in claim 1 wherein said wheel support fixture includes a lower member and an upper member, said lower member movable in a generally vertical direction between a wheel loading retracted position and an extending working position.

9. The vehicle wheel welding station defined in claim 8 wherein said upper member is operatively connected to a drive mechanism to rotate the wheel relative to said welding torches when said lower member is in said extending working position.

\* \* \* \* \*